(12) United States Patent
Andreae et al.

(10) Patent No.: US 7,757,549 B2
(45) Date of Patent: Jul. 20, 2010

(54) APPARATUS, SYSTEM, AND METHOD FOR PREDICTIVE CONTROL OF A TURBOCHARGER

(75) Inventors: Morgan Andreae, Columbus, IN (US); Adrian P. Dale, Columbus, IN (US); Jeffrey Matthews, Columbus, IN (US); William A. Rankin, Columbus, IN (US); Vivek A. Sujan, Columbus, IN (US)

(73) Assignee: Cummins IP, Inc, Minneapolis, MN (US)

( * ) Notice: Subject to any disclaimer, the term of this patent is extended or adjusted under 35 U.S.C. 154(b) by 183 days.

(21) Appl. No.: 12/034,809

(22) Filed: Feb. 21, 2008

(65) Prior Publication Data

US 2009/0211248 A1    Aug. 27, 2009

(51) Int. Cl.
  *G01M 15/00* (2006.01)
(52) U.S. Cl. .................................... 73/114.77
(58) Field of Classification Search ............... 73/112.01, 73/112.03, 112.05, 114.31, 114.37, 114.77, 73/118.02
See application file for complete search history.

(56) References Cited

U.S. PATENT DOCUMENTS

| | | | |
|---|---|---|---|
| 4,483,147 A | 11/1984 | Evans et al. | |
| 5,437,539 A | 8/1995 | Gysling et al. | |
| 5,508,943 A | 4/1996 | Batson et al. | |
| 6,092,029 A | 7/2000 | Bently | |
| 6,317,655 B1 | 11/2001 | Khots et al. | |
| 6,364,602 B1 | 4/2002 | Andrew et al. | |
| 6,438,484 B1 | 8/2002 | Andrew et al. | |
| 6,536,284 B2 | 3/2003 | Bonanni | |
| 6,785,604 B2 | 8/2004 | Jacobson | |
| 6,945,047 B2 | 9/2005 | Shea et al. | |
| 7,089,738 B1 | 8/2006 | Boewe et al. | |
| 2008/0011070 A1* | 1/2008 | Wood | 73/118.1 |
| 2009/0082936 A1* | 3/2009 | Andreae et al. | 701/102 |

* cited by examiner

*Primary Examiner*—Eric S McCall
(74) *Attorney, Agent, or Firm*—Kunzler Needham Massey & Thorpe

(57) ABSTRACT

An apparatus, system, and method are disclosed for predictive control of a turbocharger. The method includes interpreting a compressor performance model for a turbocharger, and interpreting at least one current operating parameter. The method further includes calculating a performance margin, calculating a performance margin derivative, and calculating a response value. The performance margin comprises a choke margin or a surge margin according to the position of an operating point in the compressor performance model. The performance margin is implemented in a first sigmoid function, and the performance margin derivative is implemented in a second sigmoid function. The response value is determined by applying a MIN function to the output of the product of the sigmoid functions in the choke margin case, and by applying a MAX function to the product of the sigmoid functions in the surge margin case.

34 Claims, 9 Drawing Sheets

APPARATUS, SYSTEM, AND METHOD FOR PREDICTIVE CONTROL OF A TURBOCHARGER

BACKGROUND OF THE INVENTION

1. Field of the Invention

This invention relates to turbocharger control and more particularly relates to achieving predictive control of a turbocharger charge pressure.

2. Description of the Related Art

Turbochargers have been a common feature on combustion engines to enhance performance. Continuing demand for power density and torque combined with emissions regulations have required continuous innovation in turbocharger hardware and control systems. Hardware related to turbocharger control like wastegates, bypass valves, variable geometry, and adjustable vanes have been known in the art for some time. While improvements in turbocharger hardware are ongoing, turbocharger control systems are largely challenged by limits imposed by present computer processor speeds and the responsiveness of turbocharger speed sensors, which contribute to a lack of control precision during transient events in real time applications.

Present turbocharger control systems are primarily reactive systems that track only one or two system parameters to determine turbocharger speeds. Reactive turbocharger control systems using limited system parameter input may fail to predict the onset of surge and choke events that may result in suboptimal performance and stress to turbocharger components. For example, a turbocharger turbine wheel experiencing a surge event may cease rotating for periods of time, which diminishes the protective oil film covering on the turboshaft, resulting in deterioration of the turbocharger load capacity. Often, conditions resulting from surge and choke events in the turbocharger means that turbocharger control systems are very conservatively calibrated to their operating environments and thereby their performance and efficiency may be adversely affected. Present turbocharger control systems must choose between aggressively responding turbocharger control that may overshoot target speeds and target pressures in highly transient events, or less responsive turbocharger control that may not experience overshoot, but that experiences reduced transient performance. A turbocharger experiencing numerous surge and/or choke events not only adversely affects the performance of an engine but may reduce the service life and reliability of the turbocharger.

Some present turbocharger systems include more than one turbocharger stage. These systems allow greater charge densities and compression of intake air. Further, they allow the inclusion of a smaller, high pressure turbocharger to improve turbocharger response, and the inclusion of a larger, low pressure turbocharger to improve turbocharger flow capacity. However, small turbochargers are even more susceptible to surge and choke events during transience due to the low mass of the turbine wheel.

SUMMARY OF THE INVENTION

From the foregoing discussion, Applicant asserts that a need exists for an apparatus, system, and method that provides predictive control of a turbocharger to prevent the onset of surge and choke events. Beneficially, such an apparatus, system, and method would allow aggressive tuning of a turbocharger for enhanced response, but prevent turbocharger surge and choke events in transient operation with currently available sensor detection and computing hardware.

The present invention has been developed in response to the present state of the art, and in particular, in response to the problems and needs in the art that have not yet been fully solved by currently available turbocharger surge and choke control systems. Accordingly, the present invention has been developed to provide an apparatus, system, and method for predictive control of a turbocharger that overcome many or all of the above-discussed shortcomings in the art.

A system is disclosed for predictive control of a turbocharger. The system includes an internal combustion engine producing an exhaust stream. The system further includes a turbocharger receiving the exhaust stream on a turbine side, and the turbocharger receiving an inlet air stream on a compressor side. Furthermore, the system includes a controller comprising modules. A compressor performance module is configured to interpret a compressor performance model for a turbocharger, and an operating parameters module is configured to interpret at least one operating parameter. Also, a difference module is configured to calculate a performance margin according to the at least one operating parameter and the compressor performance model, and a derivation module is configured to calculate a performance margin derivative. Finally, a response module is configured to determine a response value according to the performance margin and the performance margin derivative.

An apparatus is disclosed for predictive control of a turbocharger. The apparatus includes the compressor performance module, the operating parameters module, the difference module, the derivation module, and the response module. In one example, the response value may comprise a boost target specification for a turbocharger charge pressure.

A method is disclosed for predictive control of a turbocharger. The method includes interpreting a compressor performance model for a turbocharger, and interpreting at least one current operating parameter. The at least one operating parameter may include a compressor inlet pressure, a compressor outlet pressure, a pressure ratio across a compressor, an inlet temperature, an exhaust gas recirculation (EGR) fraction, and EGR flow, an inlet air flow, a corrected air flow, a mass flow, a turbine wheel speed, a compressor wheel speed, and a turboshaft speed. The method further includes calculating a performance margin, calculating a performance margin derivative, and calculating a response value.

Calculating the response value may include determining a gain value for a control function. For example, the performance margin may comprise a choke margin where $y_1$=choke margin and $y_2$=d(choke margin)/dt. The gain value is calculated using a first sigmoidal function of the form:

$$FS_1(y_1) = \frac{a_1}{(1 + e^{b_1*(y_1-c_1)})} + d_1, \quad \text{Equation 1}$$

and a second sigmoidal function of the form:

$$FS_2(y_2) = \frac{a_2}{(1 + e^{b_2*(y_2-c_2)})} + d_2. \quad \text{Equation 2}$$

In one instance the performance margin comprises a choke margin and determining the gain value (RV) includes applying a MIN function such that:

$$RV=\min[(FS_1(y_1)*FS_2(y_2)),1] \quad \text{Equation 3}$$

Determining the gain value in the choke margin example may include implementing constant values corresponding to:

$a=-0.1$, $b_1=-0.25$, $c_1=15$, $d_1=1$, $a_2=0.1$, $b_2=-1$, $c_2=3.5$, and $d_2=1$. Implementing a range of constant values may be useful for other various applications where $a_1$ ranges from about $-0.05$ to $-0.5$, $b_1$ ranges from about $-0.1$ to $-0.6$, and $c_1$ ranges from about $-10$ to $20$, $a_2$ ranges from about $0.05$ to $0.5$, $b_2$ ranges from about $-0.1$ to $-2$, and $c_2$ ranges from about $-2$ to $6$.

The method further includes calculating the response value where the performance margin comprises a surge margin. In the example $y_1$=surge margin and $y_2$=d(surge margin)/dt. The gain value (RV) is calculated with the preceding Equation 1 and Equation 2, and determining the gain value (RV) further includes applying a MAX function such that:

$$RV=\max[(FS_1(y_1)*FS_2(y_2)),1] \qquad \text{Equation 4}$$

Determining the response value where the performance margin comprises the surge margin further implements constant values correspond to $a_1=0.1$, $b_1=-0.25$, $c_1=15$, $d_1=1$, $a_2=-0.1$, $b_2=-1$, $c_2=3.5$, and $d_2=1$. Alternate applications may implement constant values where $a_1$ ranges from about $0.05$ to $0.5$, $b_1$ ranges from about $-0.1$ to $-0.6$, $c_1$ ranges from about $-10$ to $20$, $a_2$ ranges from about $-0.05$ to $-0.5$, $b_2$ ranges from about $-0.1$ to $-2.0$, and $c_2$ ranges from about $-2$ to $6$. The gain value may correspond to a boost pressure target gain value for a high pressure turbocharger.

A computer program product is disclosed for predictive control of a turbocharger. The computer readable program when executed on a computer causes the computer to interpret a compressor performance model for a high pressure turbocharger, and interpret current operating parameters. Current operating parameters include a pressure ratio and a corrected flow corresponding to a high pressure turbocharger. The computer program product calculates the performance margin based on the pressure ratio, the corrected flow, and the compressor performance model. The computer program product further calculates the performance margin derivative comprising a rate of change of the performance margin over a time interval, and calculates a response value according to the performance margin and the performance margin derivative. The computer program product controls a turbine bypass valve such that the boost target is achieved.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
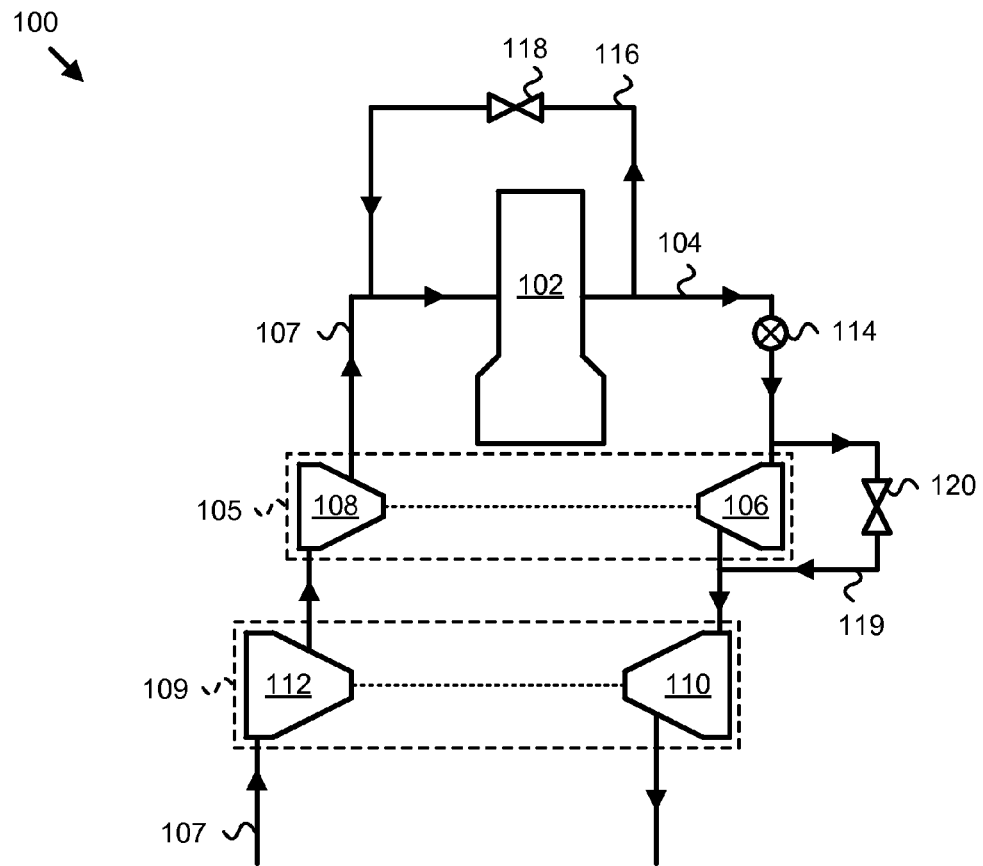
FIG. 1 is a schematic block diagram illustrating one embodiment of a system for predictive control of a turbocharger in accordance with the present invention.
Figure 1:
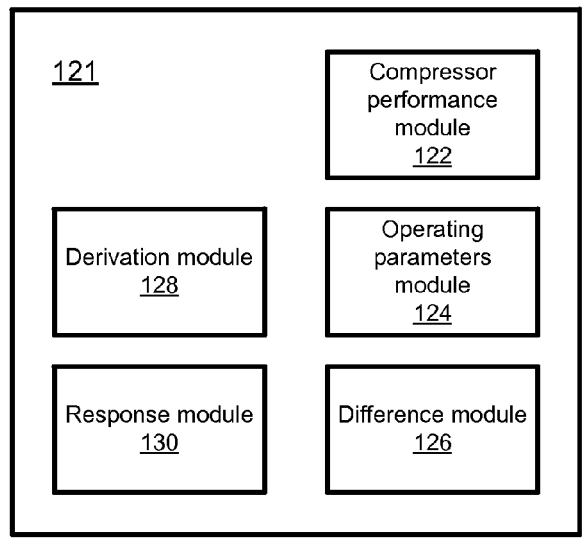

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system 100 for predictive control of a turbocharger in accordance with the present invention. The system 100 comprises a combustion engine 102 producing an exhaust stream 104. In one example the combustion engine 102 comprises a diesel engine 102. The system 100 comprises a turbocharger 105 receiving the exhaust stream 104 on a turbine side 106, and the turbocharger 105 receiving an inlet air stream 107 on a compressor side 108. In one embodiment of the present invention the turbocharger 105 comprises a high pressure turbocharger 105 in a dual stage turbocharger system. The system 100 may further comprise low pressure turbocharger 109 receiving the exhaust stream 104 on a turbine side 110, and the low pressure turbocharger 105 receiving an inlet air stream 107 on a compressor side 112.

One embodiment of the system 100 may comprise a turbocharger wastegate 114 that may direct a portion of the exhaust stream 104 away from the turbine 106. The system 100 may comprise an exhaust gas recirculation (EGR) path 116, wherein a portion of the exhaust stream 104 is directed through the EGR path 116 when an EGR valve 118 is open. The system 100 may further comprise a turbocharger bypass path 119, wherein a portion of the exhaust stream 104 is directed around the turbocharger 105 when a bypass valve 120 is open. The system 100 comprises a controller 121 comprising modules. In one embodiment the controller 121 comprises part of an engine control module (ECM) and may be in communication with various components associated with the system 100 including sensors, detectors, networks, actuators and datalinks. Further examples of components may include pressure sensors, temperature sensors, time interval indicators, mass flow detectors, network published data values, solenoids, valves, and/or any other components beneficial for determining an operating state of the system 100 and controlling various aspects of the system 100, such as differential pressure across the turbocharger 105.

The controller 121 comprises a compressor performance module 122 configured to interpret a compressor performance model for the turbocharger 105. The compressor performance model may comprise a compressor map for a turbocharger 105 as is well known in the art. The controller 121 further comprises an operating conditions module 124 configured to interpret at least one operating parameter of the system 100. The controller 121 comprises a difference module 126 configured to calculate a performance margin according to the at least one operating parameter and the compressor performance model. The controller 121 comprises a derivation module 128 configured to calculate a performance margin derivative, the performance margin derivative comprising a rate of change of the performance margin over a time interval. The controller 121 comprises a response module 130 configured to determine a response value according to the performance margin and the performance margin derivative.

Figure 2:
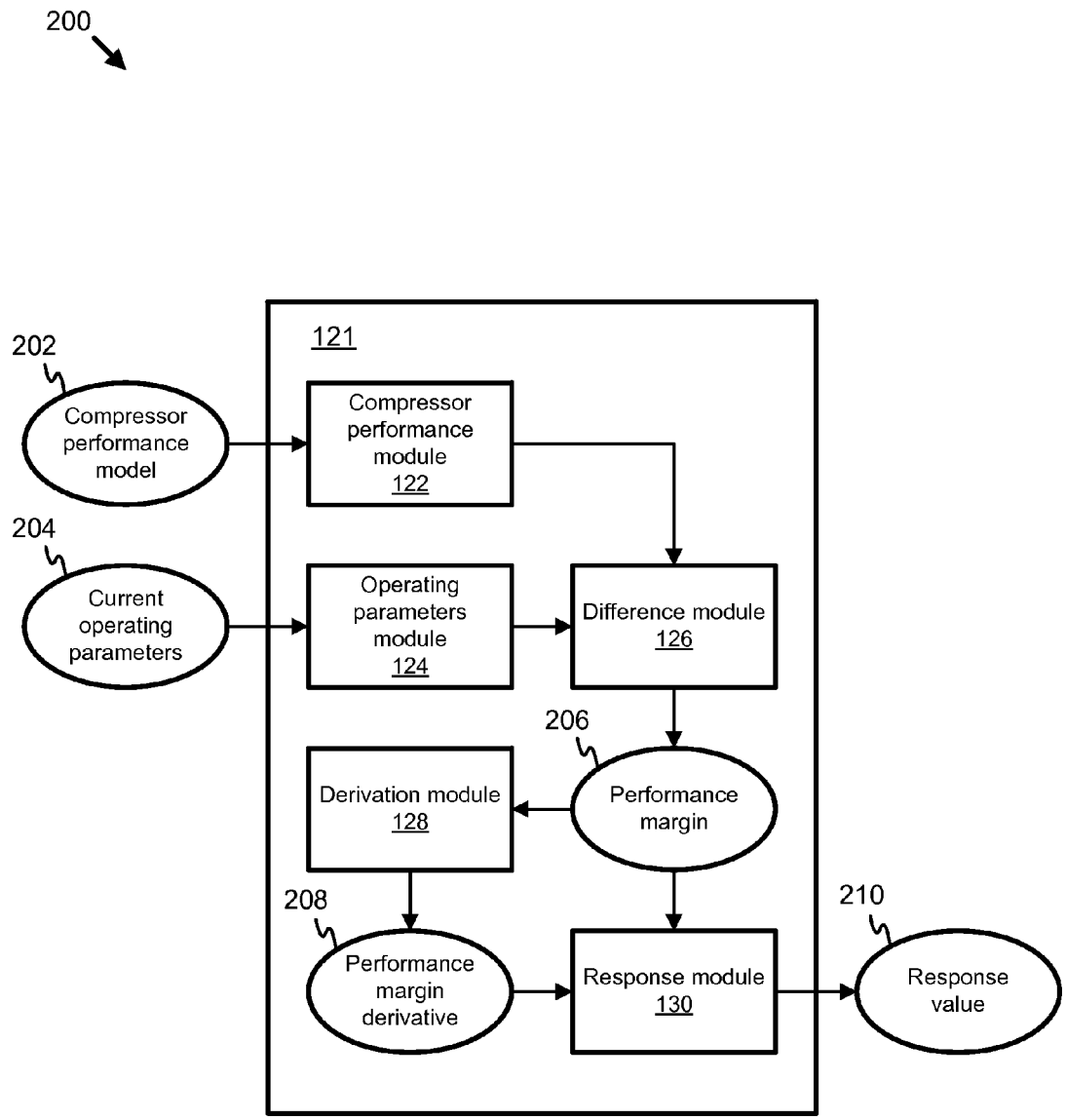
FIG. 2 is a schematic block diagram illustrating one embodiment of an apparatus for predictive control of a turbocharger in accordance with the present invention.

FIG. 2 is a schematic block diagram illustrating one embodiment of an apparatus 200 for predictive control of a turbocharger 105 in accordance with the present invention. The apparatus 200 comprises the controller 121 comprising the compressor performance module 122 configured to interpret the compressor performance model 202 for the turbocharger 105. The apparatus 200 further comprises the operating parameters module 124 configured to interpret at least one operating parameter 204. Interpreting the at least one current operating parameter 204 may comprise interpreting at least one current operating parameter 204 selected from the group consisting of a compressor inlet pressure, a compressor outlet pressure, a pressure ratio across a compressor, an inlet temperature, an EGR fraction, an EGR flow, an inlet air flow, a corrected air flow, a mass flow, a turbine wheel speed, a compressor wheel speed, and a turboshaft speed.

The apparatus 200 further comprises the difference module 126 configured to calculate a performance margin 206 according to the at least one current operating parameter 204 and the compressor performance model 202. The compressor performance model 202 may comprise the compressor map 202 for a turbocharger 105, and the performance margin 206 may comprise the distance between an operating point on the compressor map 202 and a performance curve of the compressor map 202. In one embodiment the performance curve comprises a choke line on the compressor map 202, and the performance margin 206 comprises a choke margin. In a further embodiment the performance curve comprises a surge line on the compressor map 202, and the performance margin 206 comprises a surge margin. The choke line and the surge line are aspects of the compressor map 202 that are well known by one of skill in the art and manufacturers of turbochargers provide compressor maps 202 for their turbochargers.

The apparatus 200 comprises the derivation module 128 configured to calculate the performance margin derivative 208. The performance margin derivative 208 comprises the rate of change of the performance margin 206 over a time interval. Calculating a derivative based on a series of data is a mechanical step for one of skill in the art. Furthermore, the derivative may be filtered such that "noise" in the data is reduced to improve the precision and accuracy of derivative calculations. The apparatus 200 further comprises the response module 130 configured to determine the response value 210 according to the performance margin 206 and the performance margin derivative 208. In one embodiment of the present invention the response value 210 comprises a boost target specification 210 for a turbocharger charge pressure. In another example the response value 210 may comprise a gain value 210 for a control function.

Figure 3:
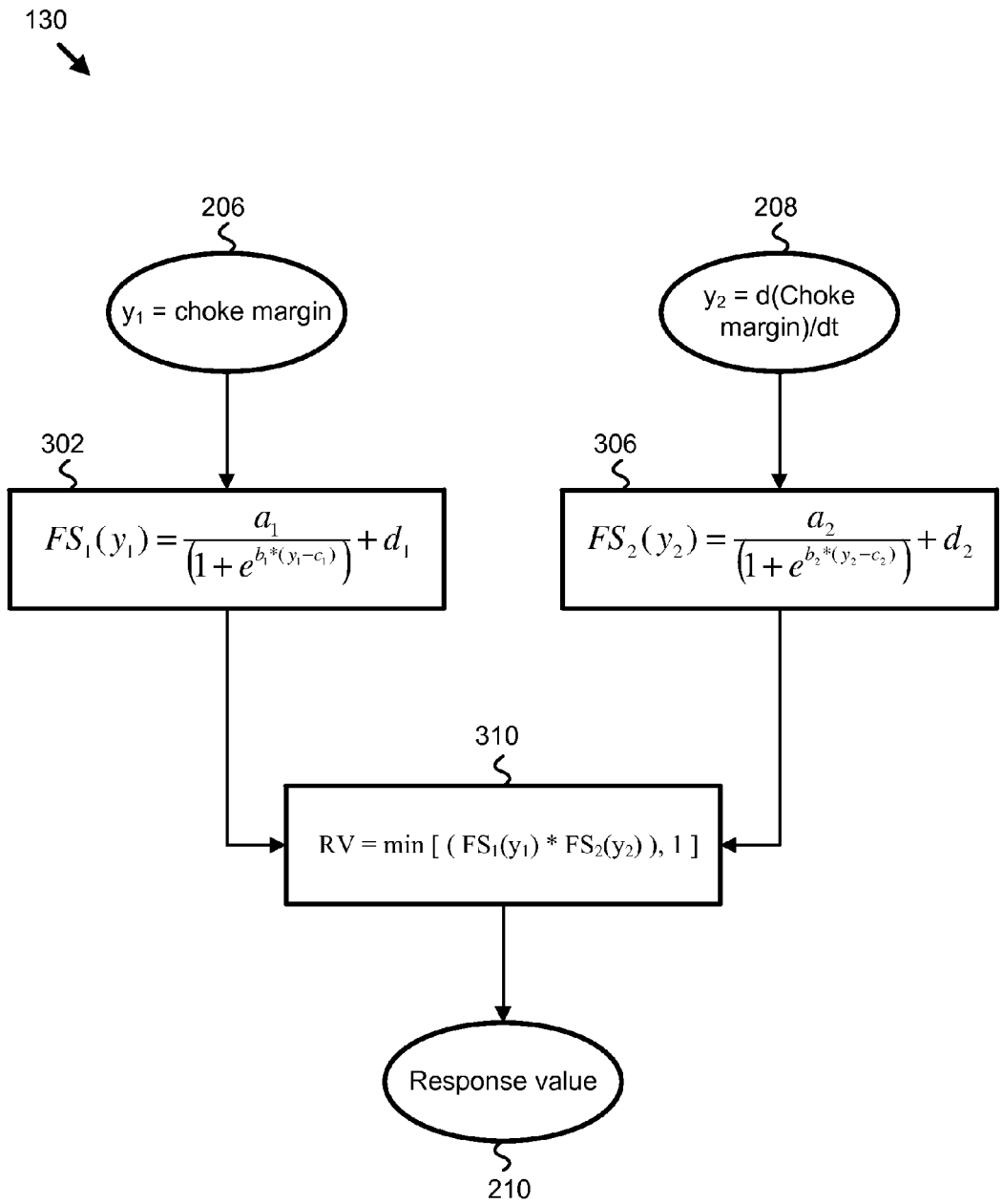
FIG. 3 is a schematic illustration of one embodiment of a response module determining a response value for the onset of a turbocharger choke in accordance with the present invention.

FIG. 3 is a schematic illustration of one embodiment of the response module 130 determining the response value 210 for the onset of a turbocharger choke in accordance with the present invention. In one embodiment calculating the response value 210 comprises determining the gain value 210 for the control function, wherein the performance margin 206 comprises the choke margin 206, and wherein $y_1$=choke margin, $y_2$=d(choke margin)/dt. The gain value 210 is calculated using a first sigmoid function 302 of the form:

$$FS_1(y_1) = \frac{a_1}{(1 + e^{b_1*(y_1-c_1)})} + d_1, \quad \text{Equation 1}$$

and a second sigmoid function of the form:

$$FS_2(y_2) = \frac{a_2}{(1 + e^{b_2*(y_2-c_2)})} + d_2. \quad \text{Equation 2}$$

Determining the response value (RV) 210 for the continuing example further comprises applying a MIN function 310 such that:

$$RV=\min[(FS_1(y_1)*FS_2(y_2)),1] \quad \text{Equation 3}$$

In one embodiment determining the gain value comprises implementing constant values corresponding to: $a_1$=−0.1, $b_1$=−0.25, $c_1$=15, $d_1$=1, $a_2$=0.1, $b_2$=−1, $c_2$=3.5, and $d_2$=1. Further embodiments of determining the gain value 210 may comprise implementing constants with a range of values corresponding to: $a_1$ ranging from about −0.05 to −0.5, $b_1$ ranging from about −0.1 to −0.6, and $c_1$ ranging from about −10 to 20, $a_2$ ranging from about 0.05 to 0.5, $b_2$ ranging from about −0.1 to −2, and $c_2$ ranging from about −2 to 6. In one embodiment of the present invention the gain value 210 comprises a boost pressure target gain value 210 for the turbocharger 105.

Figure 4:
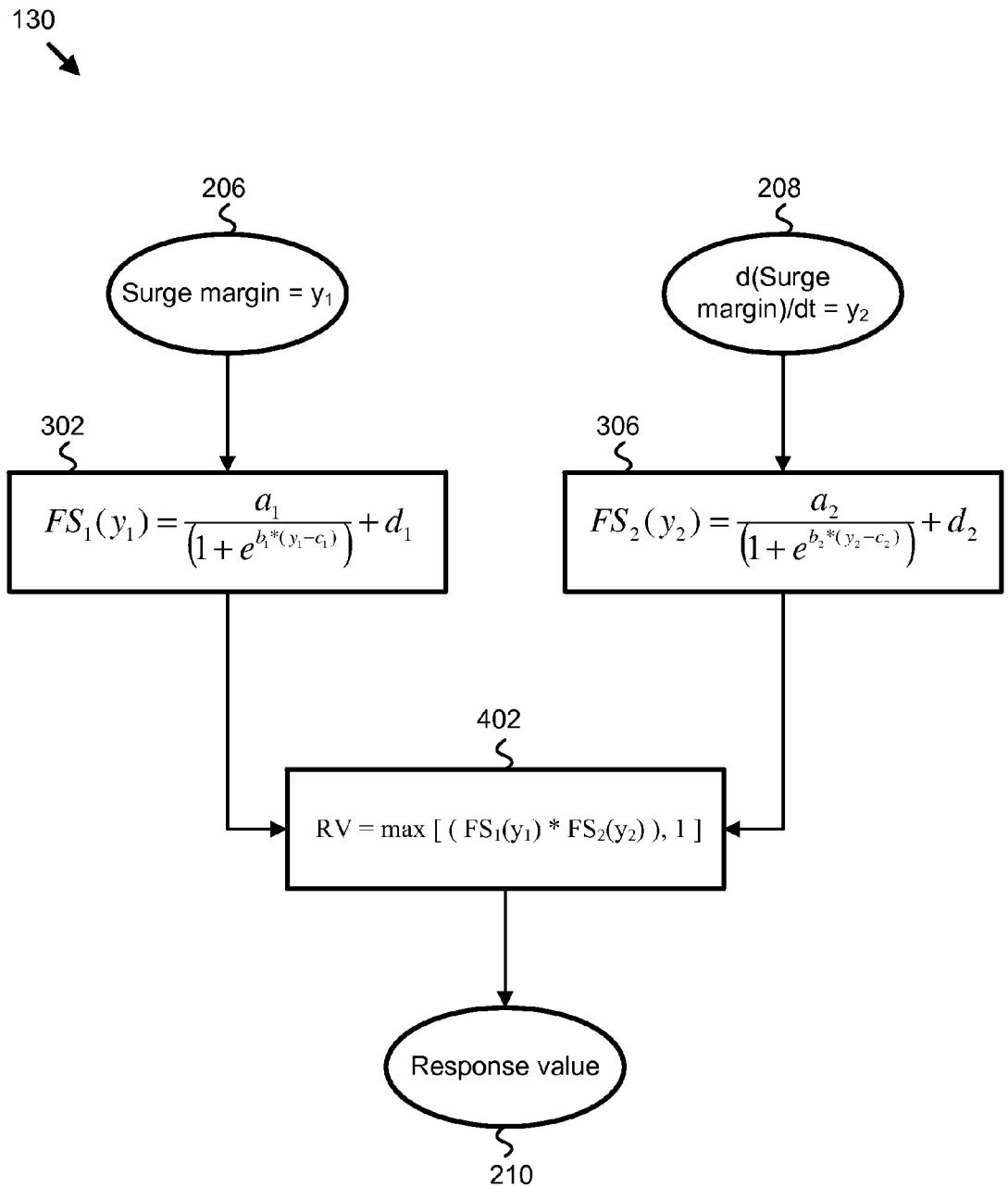
FIG. 4 is a schematic illustration of one embodiment of a response module determining a response value for the onset of a turbocharger surge in accordance with the present invention.

FIG. 4 is a schematic illustration of one embodiment of a response module 130 determining a response value 210 for the onset of a turbocharger surge in accordance with the present invention. In one embodiment calculating the response value 210 comprises determining the gain value 210 for the control function, wherein the performance margin 206 comprises the surge margin 206, and wherein $y_1$=surge margin, $y_2$=d(surge margin)/dt. The gain value 210 is calculated using the first sigmoid function 302 of the form:

$$FS_1(y_1) = \frac{a_1}{(1 + e^{b_1*(y_1-c_1)})} + d_1, \quad \text{Equation 1}$$

and the second sigmoid function of the form:

$$FS_2(y_2) = \frac{a_2}{(1 + e^{b_2*(y_2-c_2)})} + d_2. \quad \text{Equation 2}$$

Determining the response value (RV) 210 for the preceding example further comprises applying a MAX function 402 such that:

$$RV=\max[(FS_1(y_1)*FS_2(y_2)),1] \quad \text{Equation 4}$$

In one embodiment determining the gain value comprises implementing constant values corresponding to: $a_1$=0.1, $b_1$=−0.25, $c_1$=15, $d_1$=1, $a_2$=−0.1, $b_2$=−1, $c_2$=3.5, and $d_2$=1. Further embodiments of determining the gain value 210 may comprise implementing constants with a range of values corresponding to: $a_1$ ranging from about 0.05 to 0.5, $b_1$ ranging from about −0.1 to −0.6, and $c_1$ ranging from about −10 to 20, $a_2$ ranging from about −0.05 to −0.5, $b_2$ ranging from about −0.1 to −2, and $c_2$ ranging from about −2 to 6. In one embodiment of the present invention the gain value 210 comprises the boost pressure target gain value 210 for the turbocharger 105.

Figure 5:
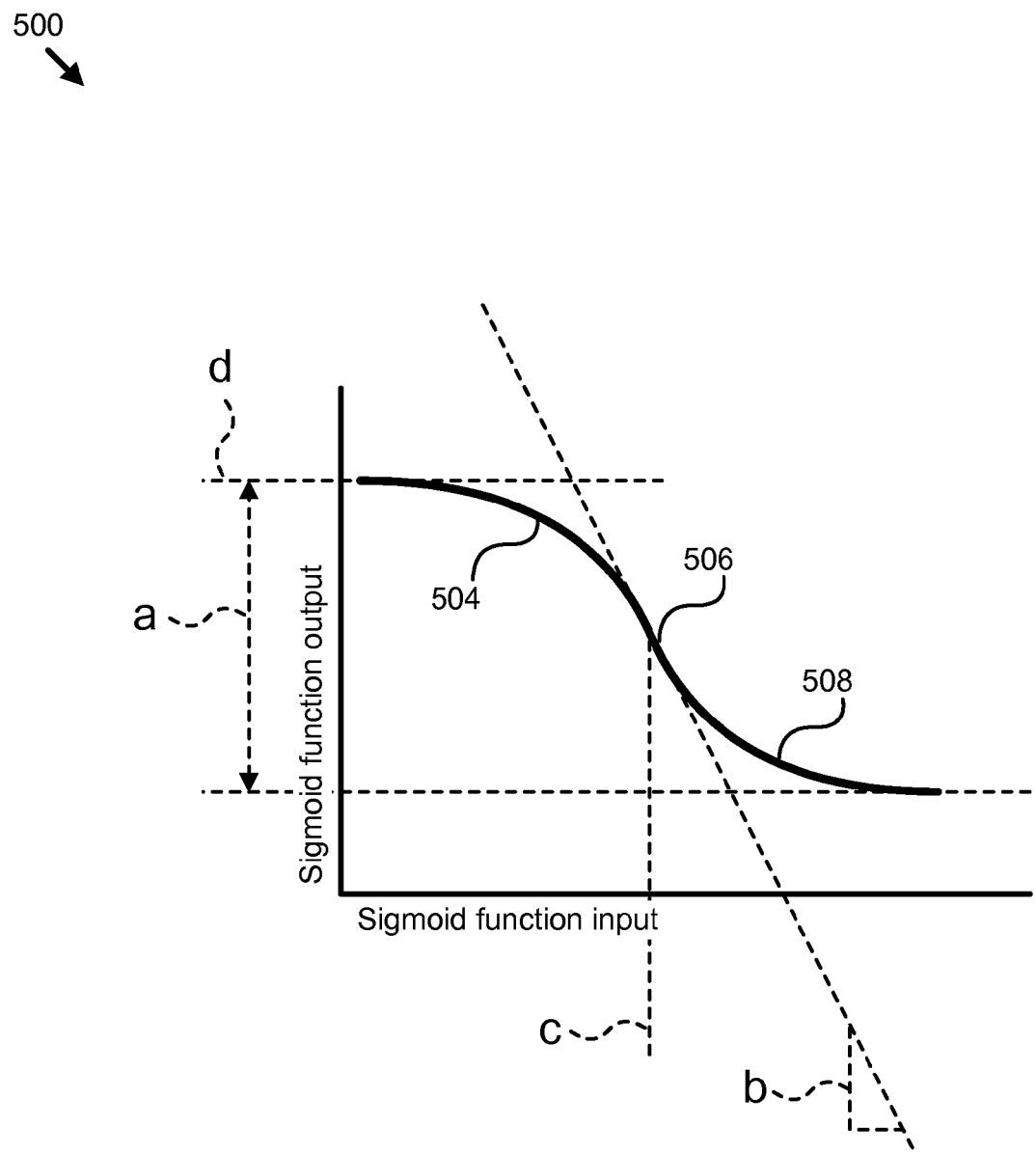
FIG. 5 is a schematic illustration of a sigmoid function in accordance with the present invention.

FIG. 5 is a schematic illustration of a sigmoid function 500 in accordance with the present invention. Sigmoid functions are well known in the physical sciences and the example of the sigmoid function 500 is provided only for clarity. The sigmoid function 500 exhibits two curves of opposite concavity (compare 504 and 508), and allows a function to traverse smoothly from a high plateau to a low plateau. The function 500 in the present invention may follow the form of Equation 1 and Equation 2, but may also follow any other form known in the art, including a polynomial of third order or higher, a set of values on a lookup table, a hyperbolic tangent function, and the like. For the function 500 using a form like the function of Equation 1, the coefficients "a" through "d" affect the function 500 as indicated in FIG. 3 and FIG. 4. The "d" coefficient is multiplied by the maximum response amplitude, and is therefore illustrated as having a value of "1" throughout the examples herein, as the response value of "1" provides the nominal turbocharger minimum or maximum response value as indicated by FIG. 3 and FIG. 4 respectively, although other conventions using a "d" value other than "1" are possible.

The value "a" provides the amount of offset from "d" at a high adjustment state. The value "c" provides the sigmoid function input value at which the inflection point occurs, which will also be half the amount of offset provided at "a". Higher values of "c" will make the function respond more slowly to a disturbance in the input, and lower values of "c" will make the function respond more quickly to a disturbance in the input. The value "b" provides the slope of the function at the inflection point 506. Higher values of "b" provide longer plateaus and a sharper transition response, while lower values of "b" provide shore plateaus and more gradual transition response.

Figure 6:
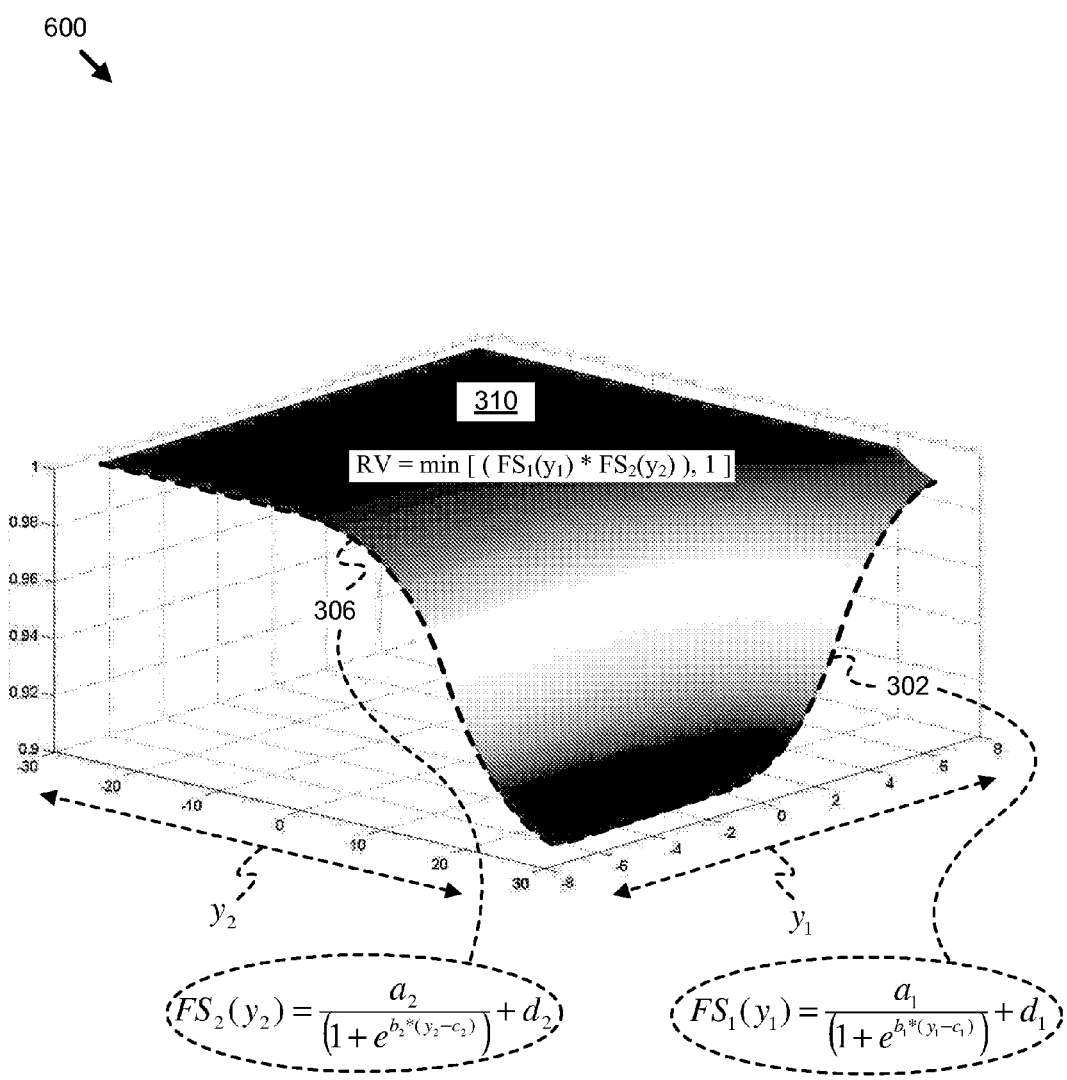
FIG. 6 is a schematic illustration of a turbocharger choke response value in accordance with the present invention.

FIG. 6 is a schematic illustration of a turbocharger choke response value 600 in accordance with the present invention. The RV 210 is shown as a three-dimensional surface 210 implementing the sigmoid functions of Equation 1 (306) and Equation 2 (302), and the RV calculated according to Equation 3 (310). The surface exhibits a large flat region where little response adjustment occurs, and wherein the high plateaus of the sigmoidal functions intersect. The effect of multiplying the sigmoidal functions is evident—where the maximum response occurs at a position where the $y_1$ is lowest and where the $y_2$ is highest. FIG. 6 is evident from an embodiment utilizing Equations 1, 2, and 3 above, and is provided for illustration only.

Figure 7:
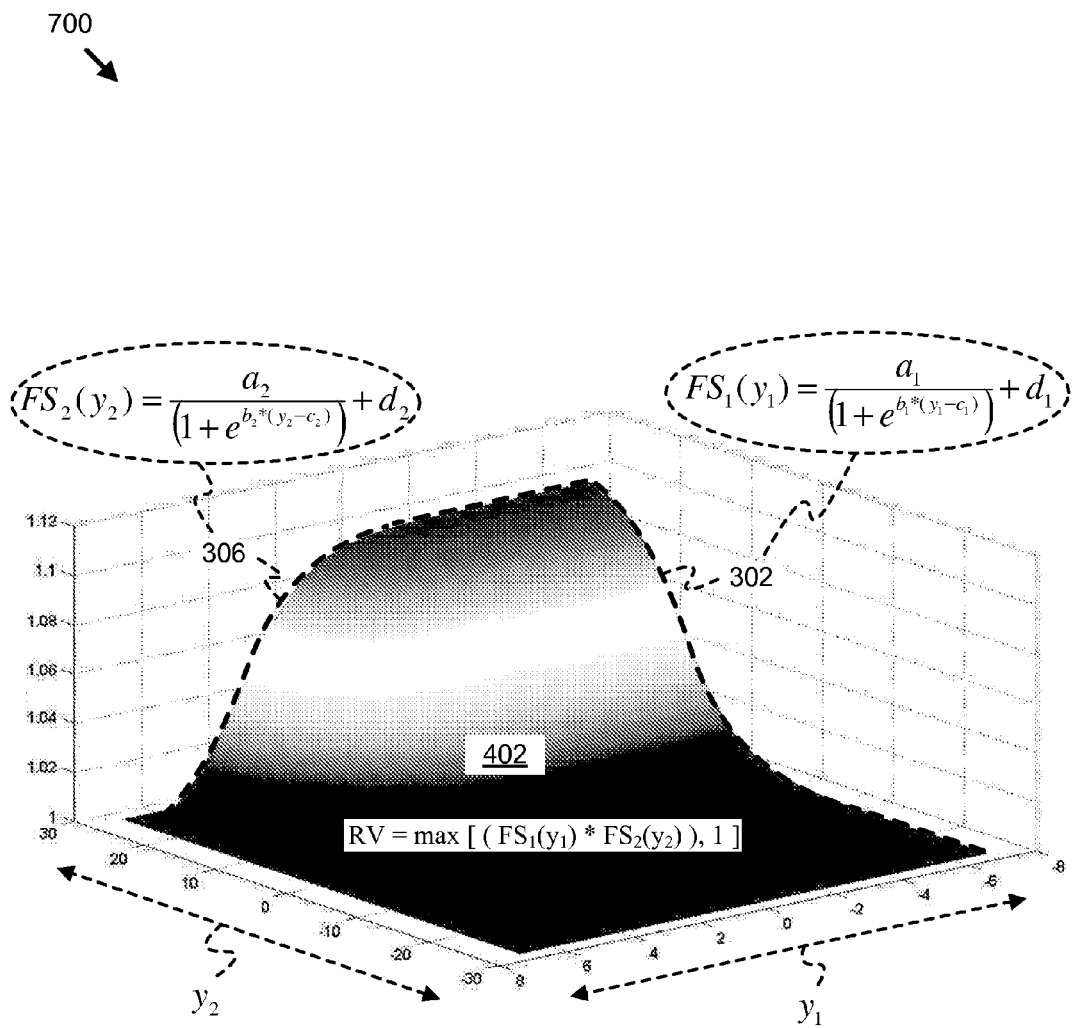
FIG. 7 is a schematic illustration of a turbocharger surge response value in accordance with the present invention.

FIG. 7 is a schematic illustration of a turbocharger surge response value 700 in accordance with the present invention. The RV 210 is shown as a three-dimensional surface 402 implementing the sigmoid functions of Equation 1 and Equation 2 in the surge response case. The RV 210 is calculated according to Equation 4 (402). The surface exhibits a ridge along where high values of the sigmoid functions intersect. FIG. 7 is evident from an embodiment utilizing Equations 1, 2, and 4 above, and is provided for illustration only.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
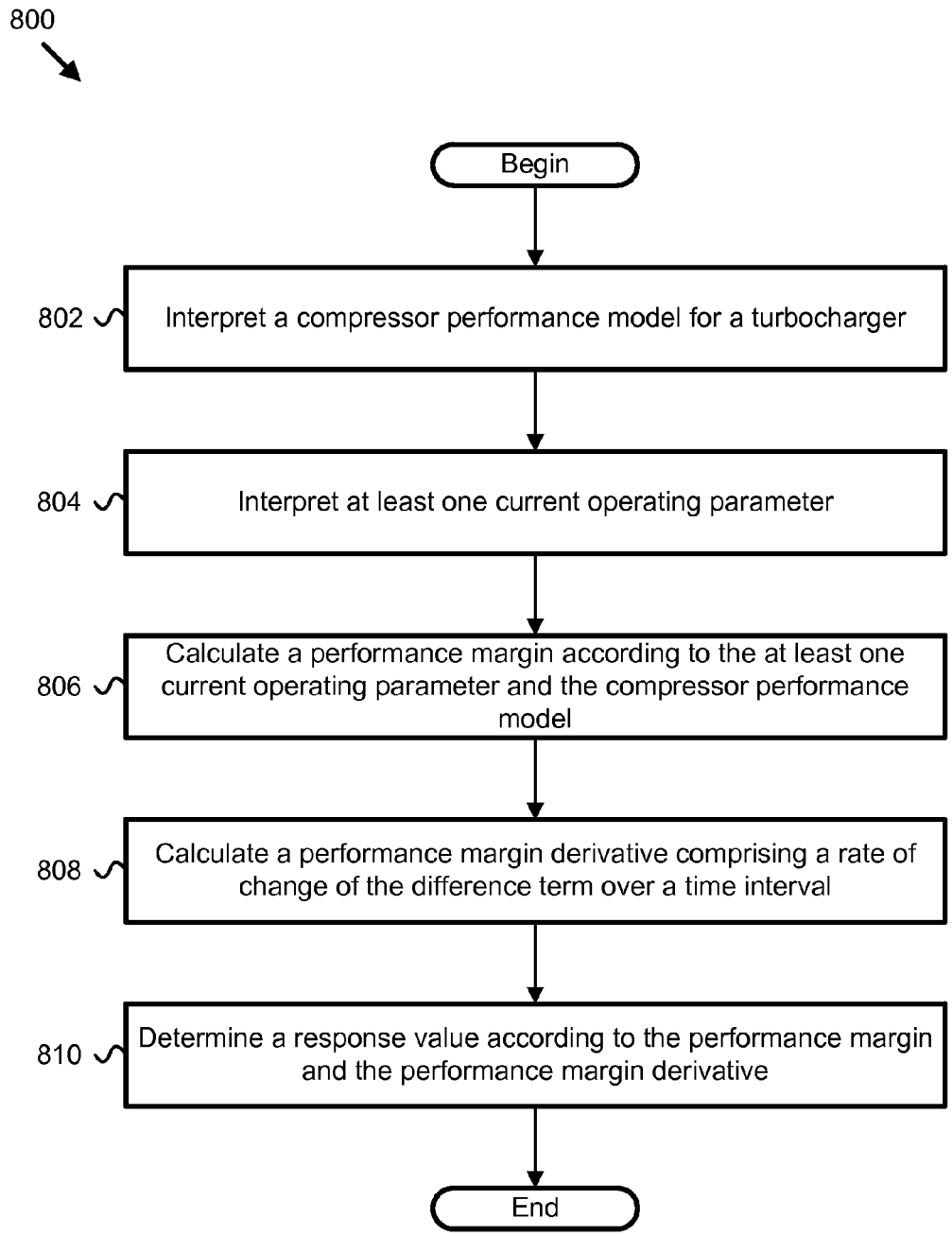
FIG. 8 is a schematic flow chart diagram illustrating one embodiment of a method for predictive control of a turbocharger in accordance with the present invention.

FIG. 8 is a schematic flow chart diagram illustrating one embodiment of a method 800 for predictive control of a turbocharger 105 in accordance with the present invention. The method 800 comprises the compressor performance module interpreting 802 a compressor performance model for a turbocharger. The method 800 continues by the operating parameters module interpreting 804 at least one current operating parameter. The method 800 includes the difference module calculating 806 the performance margin according to the at least one current operating parameter and the compressor performance model. The method further continues by the derivation module calculating 808 the performance margin derivative comprising a rate of change of the difference term over a time interval. The method concludes with the response module determining 810 the RV according to the performance margin and the performance margin derivative.

Figure 9:
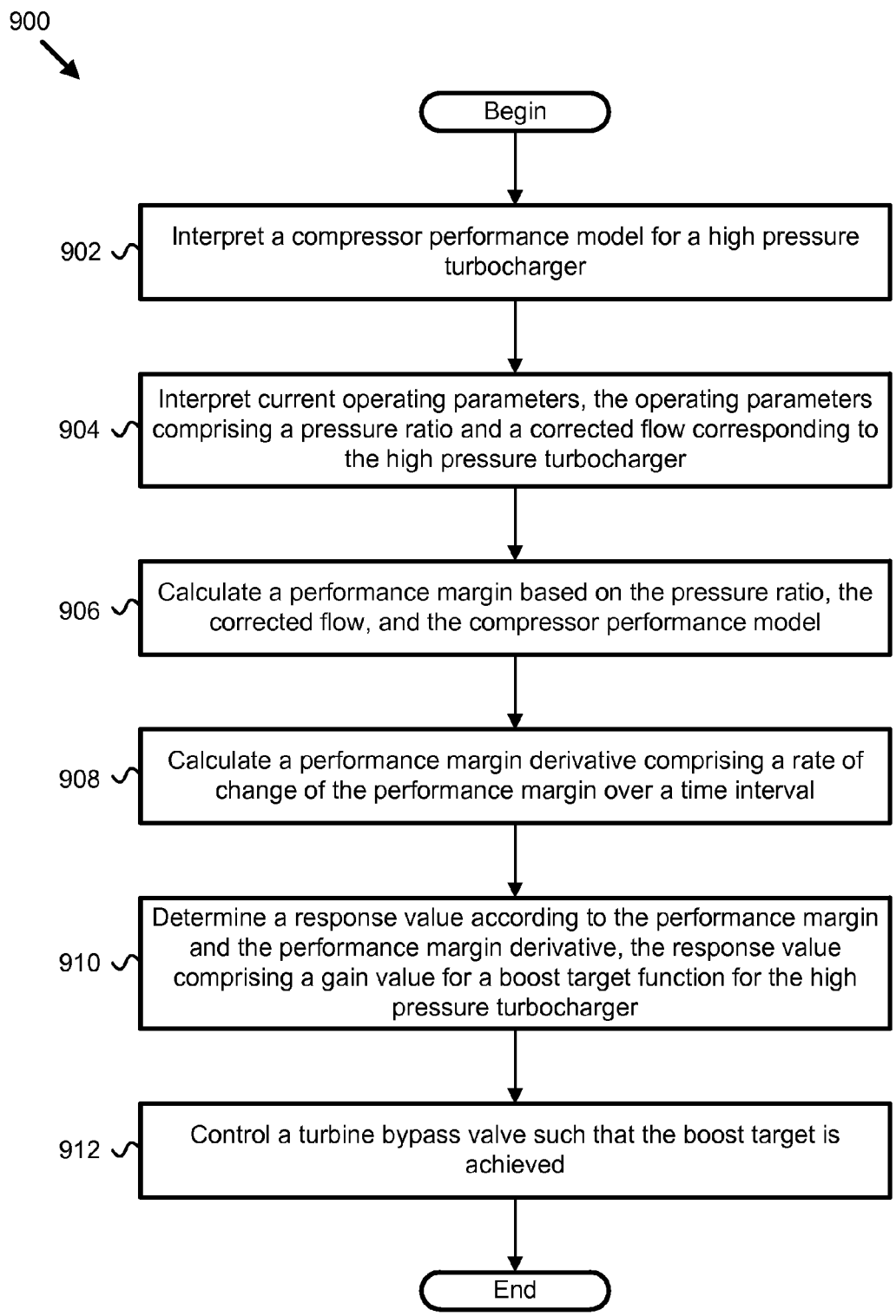
FIG. 9 is a schematic flow chart diagram illustrating an alternate embodiment of a method for predictive control of a turbocharger in accordance with the present invention.

FIG. 9 is a schematic flow chart diagram illustrating an alternate embodiment of a method 900 for predictive control of a turbocharger in accordance with the present invention. The method 900 begins by the compressor performance module interpreting 902 the compressor performance model for a turbocharger. The method 900 continues by the operating parameters module interpreting 904 at least one operating parameter. The method 900 continues by the difference module calculating 906 a performance margin according to the at least one current operating parameter and the compressor performance model. The method 900 includes the derivation module calculating 908 the performance margin derivative comprising a rate of change of the performance margin over a time interval. The method further continues by the response module determining 910 the RV according to the performance margin and the performance margin derivative, the response value comprising a gain value for a boost target function for the high pressure turbocharger. In one embodiment the method concludes by the response module controlling 912 a turbine bypass valve such that the boost target is achieved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for predictive control of a turbocharger, the method comprising:

determining a compressor performance model for a turbocharger;

determining at least one current operating parameter;

calculating a performance margin according to the at least one current operating parameter and the compressor performance model;

calculating a performance margin derivative comprising a rate of change of the performance margin over a time interval;

calculating a response value according to the performance margin and the performance margin derivative, the response value comprising a gain value for a control function of the turbocharger; and controlling the turbocharger according to the calculated response value.

2. The method of claim 1, wherein determining the at least one current operating parameter comprises determining at least one current operating parameter selected from the group consisting of a compressor inlet pressure, a compressor outlet pressure, a pressure ratio across a compressor, an inlet temperature, an exhaust gas recirculation (EGR) fraction, an EGR flow, an inlet air flow, a corrected air flow, a mass flow, a turbine wheel speed, a compressor wheel speed, and a turboshaft speed.

3. The method of claim 1, wherein calculating the response value comprises controlling at least one actuator selected from the group consisting of an exhaust gas recirculation (EGR) valve, a variable geometry turbocharger (VGT), a variable geometry compressor (VGC), a wastegate, a compressor bypass valve, a turbine bypass valve, and an intake air throttle.

4. The method of claim 1, wherein calculating the response value comprises determining a gain value for a control function, wherein the performance margin comprises a choke margin, and wherein $y_1$=choke margin, $y_2$=d(choke margin)/dt, the gain value calculated using a first sigmoidal function of the form:

$$FS_1(y_1) = \frac{a_1}{(1 + e^{b_1*(y_1-c_1)})} + d_1,$$

and a second sigmoidal function of the form:

$$FS_2(y_2) = \frac{a_2}{(1 + e^{b_2*(y_2-c_2)})} + d_2.$$

5. The method of claim 4, wherein determining the gain value comprises implementing constant values corresponding to: $a_1$=−0.1, $b_1$=−0.25, $c_1$=15, $d_1$=1, $a_2$=0.1, $b_2$=−1, $c_2$=3.5, and $d_2$=1.

6. The method of claim 4, wherein determining the gain value comprises implementing the constants with a range of values corresponding to: $a_1$ ranging from about −0.05 to −0.5, $b_1$ ranging from about −0.1 to −0.6, and $c_1$ ranging from about −10 to 20, $a_2$ ranging from about 0.05 to 0.5, $b_2$ ranging from about −0.1 to −2, and $c_2$ ranging from about −2 to 6.

7. The method of claim 4, wherein determining the gain value further comprises applying a MIN function such that:

$$RV=\min[(FS_1(y_1)*FS_2(y_2)),1].$$

8. The method of claim 7, wherein the gain value comprises a boost pressure target gain value.

9. The method of claim 1, wherein calculating the response value comprises determining a gain value for a control function, wherein the performance margin comprises a surge margin, and wherein $y_1$=surge margin, $y_2$=d(surge margin)/dt, the gain value calculated using a first sigmoidal function of the form:

$$FS_1(y_1) = \frac{a_1}{(1 + e^{b_1*(y_1-c_1)})} + d_1,$$

and a second sigmoidal function of the form:

$$FS_2(y_2) = \frac{a_2}{(1 + e^{b_2*(y_2-c_2)})} + d_2.$$

10. The method of claim 9, wherein determining the gain value comprises implementing constant values corresponding to: $a_1$=0.1, $b_1$=−0.25, $c_1$=15, $d_1$=1, $a_2$=−0.1, $b_2$=−1, $c_2$=3.5, and $d_2$=1.

11. The method of claim 9, wherein determining the gain value comprises implementing the constants with a range of values corresponding to: $a_1$ ranging from about 0.05 to 0.5, $b_1$ ranging from about −0.1 to −0.6, $c_1$ ranging from about −10 to 20, $a_2$ ranging from about −0.05 to −0.5, $b_2$ ranging from about −0.1 to −2.0, and $c_2$ ranging from about −2 to 6.

12. The method of claim 9, wherein determining the gain value further comprises applying a MAX function such that:

$RV$=max[($FS_1(y_1)*FS_2(y_2)$),1].

13. The method of claim 12, wherein the gain value comprises a boost pressure target gain value.

14. A computer program product for predictive control of a turbocharger, wherein the computer readable program when executed on a computer causes the computer to:
determine a compressor performance model for a high pressure turbocharger;
determine current operating parameters, the operating parameters comprising a pressure ratio and a corrected flow corresponding to the high pressure turbocharger;
calculate a performance margin based on the pressure ratio, the corrected flow, and the compressor performance model;
calculate a performance margin derivative comprising a rate of change of the performance margin over a time interval;
determine a response value according to the performance margin and the performance margin derivative, the response value comprising a gain value for a boost target function for the high pressure turbocharger; and
control a turbine bypass valve such that the boost target is achieved.

15. The computer program product of claim 14, wherein the compressor performance model comprises a compressor performance model for a high pressure turbocharger in a two-turbocharger system.

16. The computer program product of claim 14, wherein the current operating parameters further comprises at least one current operating parameter selected from the group consisting of a compressor inlet pressure, a compressor outlet pressure, an inlet temperature, an exhaust gas recirculation (EGR) fraction, an EGR flow, an inlet air flow, a mass flow, a turbine wheel speed, a compressor wheel speed, and a turboshaft speed.

17. The computer program product of claim 14, wherein the computer readable program when executed on a computer causes the computer to calculate the response value, the response value comprising a boost target for a turbocharger charge pressure.

18. The computer program product of claim 14, wherein the computer readable program when executed on a computer causes the computer to calculate the response value by determining a gain value for a control function, wherein the performance margin comprises a choke margin, and wherein $y_1$=choke margin, $y_2$=d(choke margin)/dt, the gain value calculated using a first sigmoidal function of the form:

$$FS_1(y_1) = \frac{a_1}{(1 + e^{b_1*(y_1-c_1)})} + d_1,$$

and a second sigmoidal function of the form:

$$FS_2(y_2) = \frac{a_2}{(1 + e^{b_2*(y_2-c_2)})} + d_2.$$

19. The computer program product of claim 18, wherein the computer readable program when executed on a computer causes the computer to determine the gain value by implementing constant values corresponding to: $a_1$=−0.1, $b_1$=−0.25, $c_1$=15, $d_1$=1, $a_2$=0.1, $b_2$=−1, $c_2$=3.5, and $d_2$=1.

20. The computer program product of claim 18, wherein the computer readable program when executed on a computer causes the computer to determine the gain value by implementing the constants with a range of values corresponding to: $a_1$ ranging from about −0.05 to −0.5, $b_1$ ranging from about −0.1 to −0.6, and $c_1$ ranging from about −10 to 20, $a_2$ ranging from about 0.05 to 0.5, $b_2$ ranging from about −0.1 to −2, and $c_2$ ranging from about −2 to 6.

21. The computer program product of claim 18, wherein the computer readable program when executed on a computer causes the computer to determine the gain value by applying a MIN function such that:

$RV$=min[($FS_1(y_1)*FS_2(y_2)$),1].

22. The computer program product of claim 21, wherein the gain value comprises a boost pressure target gain value.

23. The computer program product of claim 14, wherein the computer readable program when executed on a computer causes the computer to calculate the response value by determining a gain value for a control function, wherein the performance margin comprises a surge margin, and wherein $y_1$=surge margin, $y_2$=d(surge margin)/dt, the gain value calculated using a first sigmoidal function of the form:

$$FS_1(y_1) = \frac{a_1}{(1 + e^{b_1*(y_1-c_1)})} + d_1,$$

and a second sigmoidal function of the form:

$$FS_2(y_2) = \frac{a_2}{(1 + e^{b_2*(y_2-c_2)})} + d_2.$$

24. The computer program product of claim 23, wherein the computer readable program when executed on a computer causes the computer to determine the gain value by implementing constant values corresponding to: $a_1$=0.1, $b_1$=−0.25, $c_1$=15, $d_1$=1, $a_2$=−0.1, $b_2$=−1, $c_2$=3.5, and $d_2$=1.

25. The computer program product of claim 23, wherein the computer readable program when executed on a computer causes the computer to determine the gain value by implementing the constants with a range of values corresponding to: $a_1$ ranging from about 0.05 to 0.5, $b_1$ ranging from about −0.1 to −0.6, $c_1$ ranging from about −10 to 20, $a_2$ ranging from about −0.05 to −0.5, $b_2$ ranging from about −0.1 to −2.0, and $c_2$ ranging from about −2 to 6.

26. The computer program product of claim 23, wherein the computer readable program when executed on a computer causes the computer to determine the gain value by applying a MAX function such that:

$$RV=\max[(FS_1(y_1)*FS_2(y_2)),1].$$

27. The computer program product of claim 26, wherein the gain value comprises a boost pressure target gain value.

28. An apparatus for predictive control of a turbocharger, the apparatus comprising:
- a compressor performance module configured to determine a compressor performance model for a turbocharger;
- an operating parameters module configured to determine at least one operating parameter;
- a difference module configured to calculate a performance margin according to the at least one operating parameter and the compressor performance model;
- a derivation module configured to calculate a performance margin derivative, the performance margin derivative comprising a rate of change of the performance margin over a time interval;
- a response module configured to determine a response value according to the performance margin and the performance margin derivative, the response value comprising a gain value for a control function of the high pressure turbocharger; and
- a control module configured to control the turbocharger according to the determined response value.

29. The apparatus of claim 28, wherein the response value comprises a boost target specification for a turbocharger charge pressure.

30. The apparatus of claim 28, wherein the turbocharger comprises a high pressure turbocharger.

31. The apparatus of claim 28, wherein the turbocharger comprises a high pressure turbocharger in a two-turbocharger system.

32. A system for predictive control of a turbocharger, the system comprising:
- an internal combustion engine producing an exhaust stream;
- a turbocharger comprising a turbine coupled to a compressor, wherein the turbine receives the exhaust stream and the compressor receives an inlet air stream;
- a controller comprising:
  - a compressor performance module configured to determine a compressor performance model for a turbocharger;
  - an operating parameters module configured to determine at least one operating parameter;
  - a difference module configured to calculate a performance margin according to the at least one operating parameter and the compressor performance model;
  - a derivation module configured to calculate a performance margin derivative, the performance margin derivative comprising a rate of change of the performance margin over a time interval;
  - a response module configured to determine a response value according to the performance margin and the performance margin derivative, the response value comprising a gain value for a control function of the turbocharger; and
  - a control module configured to control the turbocharger according to the determined response value.

33. The system of claim 32, further comprising an exhaust gas recirculation (EGR) path, wherein a portion of the exhaust stream is directed through the EGR path when an EGR valve is open.

34. The system of claim 32, further comprising a turbocharger bypass path, wherein a portion of the exhaust stream is directed around the turbocharger when a bypass valve is open.

* * * * *